US006973989B2

(12) United States Patent
Williams

(10) Patent No.: US 6,973,989 B2
(45) Date of Patent: *Dec. 13, 2005

(54) STEER-BY-WIRE STEERING SYSTEM WITH ROAD FEEL

(75) Inventor: Daniel E. Williams, W. Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/239,756

(22) PCT Filed: Mar. 30, 2001

(86) PCT No.: PCT/US01/10566

§ 371 (c)(1),
(2), (4) Date: Jan. 6, 2003

(87) PCT Pub. No.: WO01/74644

PCT Pub. Date: Oct. 11, 2001

(65) Prior Publication Data

US 2004/0020706 A1 Feb. 5, 2004

(51) Int. Cl.[7] .................................................. B62D 5/04
(52) U.S. Cl. ...................... 180/402; 180/444; 180/446
(58) Field of Search ................................ 180/402, 403, 180/412, 413, 443, 444, 446; 701/41–43

(56) References Cited

U.S. PATENT DOCUMENTS

| 4,741,409 A | 5/1988 | Westercamp et al. |
| 4,830,127 A | 5/1989 | Ito et al. |
| 4,860,844 A | 8/1989 | O'Neil |
| 4,865,144 A | 9/1989 | North |
| 5,228,757 A | 7/1993 | Ito et al. |
| 5,247,441 A | 9/1993 | Serizawa et al. |
| 5,251,135 A | 10/1993 | Serizawa et al. |
| 5,347,458 A | 9/1994 | Serizawa et al. |
| 5,511,629 A | 4/1996 | Vogel |
| 5,709,281 A | 1/1998 | Sherwin et al. |
| 5,828,972 A | 10/1998 | Asanuma et al. |
| 5,880,367 A | 3/1999 | Vaughn |
| 5,925,083 A | 7/1999 | Ackermann |
| 6,097,286 A | 8/2000 | Discenzo |
| 6,098,296 A | 8/2000 | Perisho, Jr. et al. |
| 6,112,844 A | 9/2000 | Bohner et al. |
| 6,176,341 B1 | 1/2001 | Ansari |
| 6,213,248 B1 | 4/2001 | Kawaguchi et al. |
| 6,219,604 B1 | 4/2001 | Dilger et al. |
| 6,547,029 B2 * | 4/2003 | Peppler et al. ............. 180/402 |

FOREIGN PATENT DOCUMENTS

WO    WO0174644 A1    10/2001

* cited by examiner

Primary Examiner—Anne Marie Boehler
(74) Attorney, Agent, or Firm—Tarolli, Sundheim, Covell & Tummino L.L.P.

(57) ABSTRACT

A steering apparatus (10) for a vehicle having steerable road-engaging wheels comprises a rotatable steering wheel (11) and a sensor (12) which senses the rotational position of the steering wheel and generates a first signal corresponding to the sensed rotational position of the steering wheel (11). A first electric motor (14), when energized, resists rotation of the steering wheel (11). A second electric motor (20) is controlled by the signal generated by the sensor for sensing the rotational position of the steering wheel (11). A steering gear (130) is actuated by the second electric motor (20) to turn the steerable wheels of the vehicle. An electrical circuit (19) includes the first and second motors (14 and 20) in series.

13 Claims, 4 Drawing Sheets

STEER-BY-WIRE STEERING SYSTEM WITH ROAD FEEL

TECHNICAL FIELD

The present invention relates to a steering apparatus for a vehicle having steerable road-engaging wheels.

BACKGROUND OF THE INVENTION

Integral hydraulic power steering gears are commonly used in trucks, heavy equipment such as earth-moving vehicles, and construction vehicles. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to steerable wheels of a vehicle to steer the vehicle when the output shaft is rotated.

The hydraulic control valve assembly controls the flow of pressurized hydraulic fluid between a hydraulic pump and one of the chamber portions to control the direction and amount of steering. The valve assembly typically comprises two relatively rotatable valve elements, one of which is connected to a rotatable input shaft operatively coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

In thee typical integral hydraulic power steering gear, the input shaft is connected to the vehicle steering wheel by one or more intermediate shafts. The intermediate shafts are usually relatively long and can be prone to excessive lash. It is desirable to eliminate the intermediate shaft from the vehicle steering system. The intermediate shaft can be eliminated, and thus there is no mechanical connection between the steering wheel and the steering gear. Such systems are known, and are commonly referred to as "steer-by-wire" systems.

SUMMARY OF THE INVENTION

The present invention relates to a steering apparatus for a vehicle having steerable road-engaging wheels. The apparatus comprises a rotatable steering wheel and a sensor which senses the rotational position of the steering wheel and generates a first signal corresponding to the sensed rotational position of the steering wheel. A first electric motor, when energized, resists rotation of the steering wheel. A second electric motor is controlled by the signal generated by the sensor for sensing the rotational position of the steering wheel. A steering gear is actuated by the second electric motor to turn the steerable wheels of the vehicle. An electrical circuit includes the first and second motors in series.

One feature of the present invention is that the magnitude of the electrical current through the first and second motors may be substantially the same, and thus the torque produced by the first and second motors may be substantially the same. Thus, the driver of the vehicle experiences a road feel as though there was a mechanical connection between the steering wheel and the steering gear.

A further embodiment of the present invention is a steering apparatus for a vehicle having at least two steerable road-engaging wheels. The apparatus includes a vehicle steering wheel and a sensor for sensing the rotational position of the steering wheel and for generating a first signal corresponding to the sensed rotational position of the steering wheel. A first electric motor, when actuated, resists rotation of the steering wheel. A second electric motor and a third electric motor are controlled by the first signal. The second and third electric motors are associated with first and second steering gears, respectively, and actuate the first and second steering gears to turn respective steerable road-engaging wheels on either end of an axle, or to steer two axles with conventional tie rod linkage. An electrical circuit includes the second and third motors in parallel with each other and in series with the first electric motor.

BRIEF DESCRIPTION OF THE DRAWINGS

Further features and advantages of the present invention will be apparent to those skilled in the art to which the present invention relates from the following detailed description of preferred embodiments of the present invention made with reference to the accompanying drawings, in which.

DESCRIPTION OF THE PREFERRED EMBODIMENTS

Figure 1:
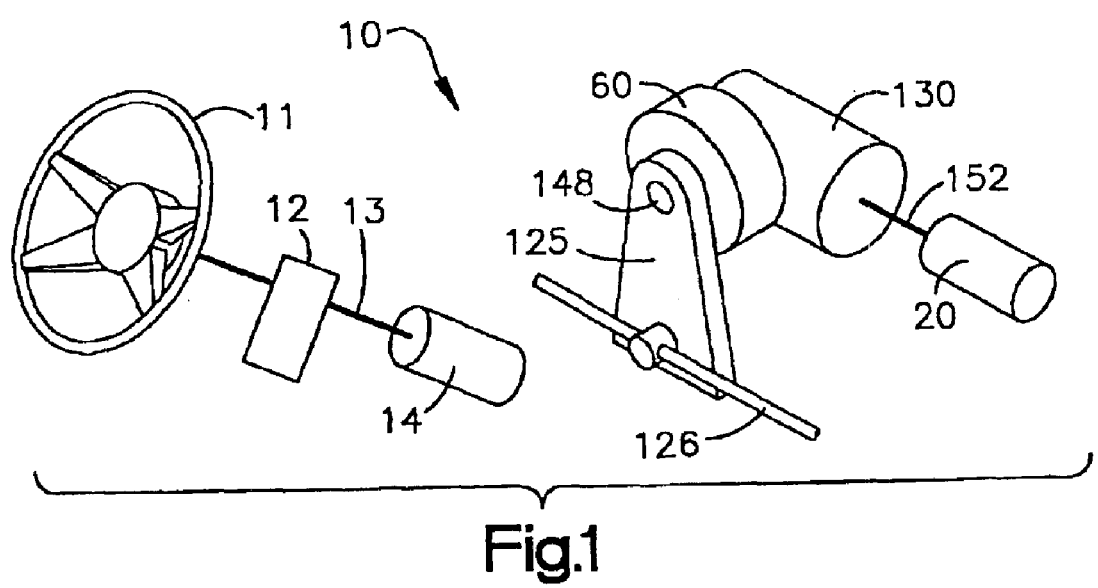
FIG. 1 is a schematic diagram of a first embodiment of a steering apparatus embodying the present invention.

The present invention is embodied in a steering apparatus generally designated 10 in FIG. 1. The steering apparatus 10 includes a steering wheel 11 which is turned manually by the driver in the vehicle. A suitable sensor 12 senses the angular position of the steering wheel 11. The sensor 12 provides an output signal dependent upon the amount of steering wheel turning and the angular position of the steering wheel. The position sensor 12 may be any suitable known sensor. The position sensor 12 provides an output signal which controls an electric motor 20.

As shown schematically in FIG. 1, rotation of the steering wheel 11 causes rotation of a shaft 13 which is associated with the position sensor 12. Also associated with the shaft 13 is an electric motor 14 which is constructed to resist turning of the shaft 13 by the driver of the vehicle. The electric motor 14 may be any suitable variable speed reversible electric motor.

The steering apparatus 10 is a steer-by-wire system. The steering apparatus 10 has no mechanical connection between the steering wheel 11 and a steering gear 130 which is operatively coupled with at least one steerable road-engaging wheel (not shown) on the end of a vehicle axle (not shown). The steering gear 130 may be of any suitable construction, but is preferably an integral hydraulic steering gear which includes a hydraulic motor and a directional control valve for actuating the hydraulic motor, as is known in the art.

Figure 2:
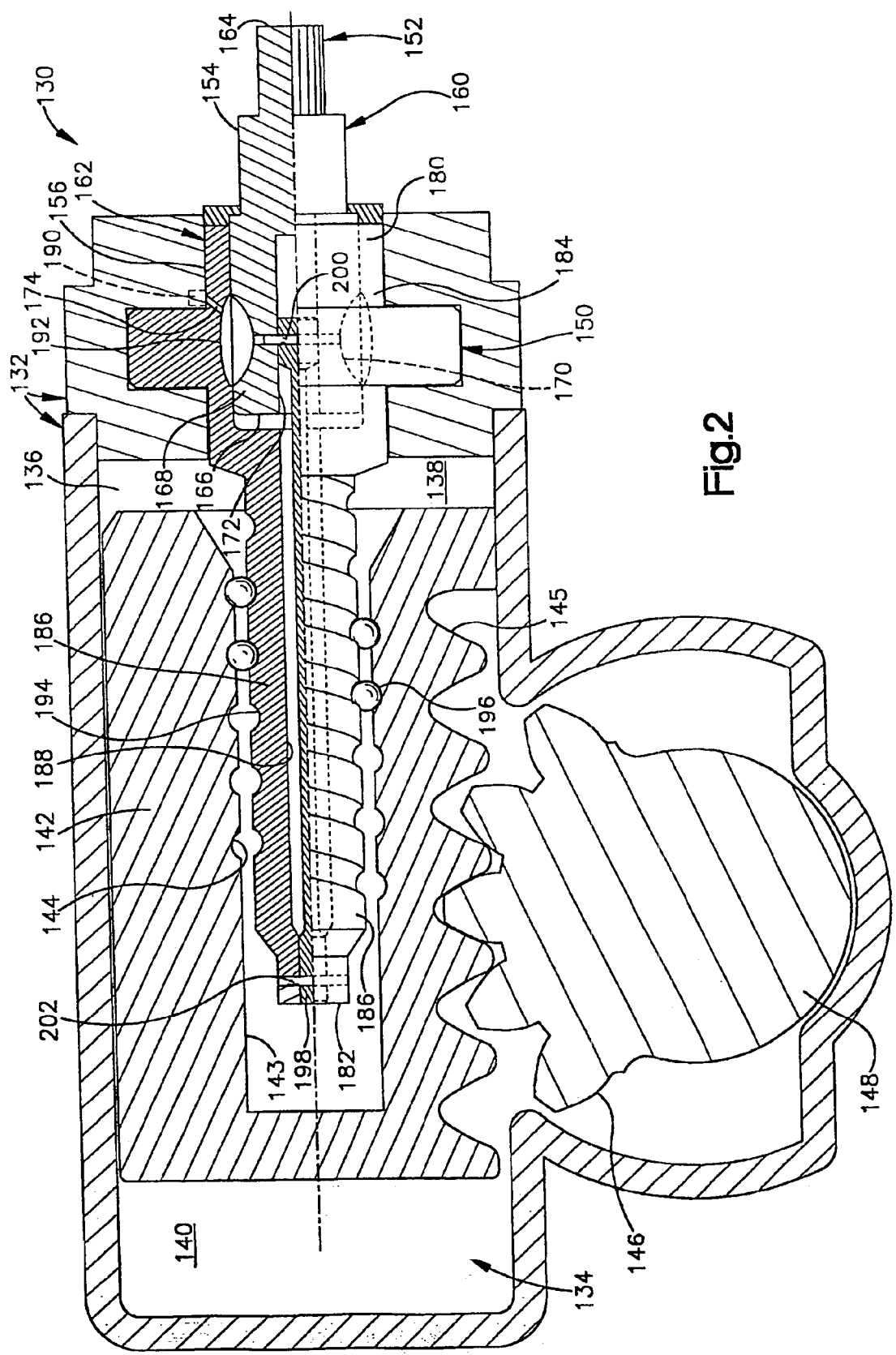
FIG. 2 is a cross-sectional view of a part of the steering apparatus of FIG. 1.

The integral hydraulic power steering gear 130 includes a two-piece housing 132 (FIG. 2) having a hydraulic power cylinder 134. The power cylinder 134 comprises a chamber 136 divided into two chamber portions 138 and 140, respectively, by a piston 142. The piston 142 includes an inner bore 143 with a helical groove 144. The piston 142 also has a set of external teeth 145 which mesh with a sector gear 146. The sector gear 146 is fixed to an output shaft 148 which extends outwardly from the housing 132. The output shaft 148 is connected to a pitman arm 125 (FIG. 1) which, in turn, is connected via steering linkage 126 to the steerable wheels to steer the vehicle. As the piston 142 moves in the chamber 136, the output shaft 148 is rotated to operate the steering linkage 126, which turns the steerable wheels of the vehicle.

A hydraulic control valve assembly 150 (FIG. 2) controls the flow of pressurized hydraulic fluid between a hydraulic circuit including a hydraulic pump (not shown) and one of the chamber portions 138 and 140 to control the direction and amount of steering. The valve assembly 150 is actuated by a rotatable input shaft 152. The input shaft 152 is rotated by the electric motor 20.

The valve assembly 150 comprises first and second valve members 154 and 156, respectively. The first valve member 154 comprises a valve core 160 and the second valve member 156 comprises a valve sleeve 162. The valve core 160 is located coaxially within the valve sleeve 162 and is supported for rotation by the valve sleeve. The valve core 160 is formed integrally as one piece with the input shaft 152. The valve core 160 has oppositely disposed first and second end portions 164 and 166, respectively, and a valve section 168 between the end portions. The first end portion 164 of the valve core 160 projects beyond the valve sleeve 162 and the second end portion 166 of the valve core lies within the valve sleeve.

The valve section 168 of the valve core 160 has a plurality of circumferentially spaced, axially extending grooves 170 as is known in the art. A first portion of the grooves 170 are fluidly connected with an internal passage 172 extending from the valve section 168 of the valve core 160 to the second end portion 166. The internal passage 172 communicates via passages (not shown) with the return line of a hydraulic pump circuit (not shown). A second portion of the grooves 170 are in fluid communication with a plurality of passages 174 in the valve sleeve 162.

The valve sleeve 162 has oppositely disposed first and second ends 180 and 182, respectively. The valve sleeve 162 further includes a sleeve section 184 adjacent the first end 180 and a ball screw section 186 adjacent the second end 182. An axially extending passage 188 extends from the first end 180 of the valve sleeve 162 through the sleeve section 184 and the ball screw section 186 to the second end 182.

The first end 180 of the valve sleeve 162 includes first and second lugs (not shown) that are disposed in diametrically opposed cut-outs (not shown) in the valve core 160. Upon rotation of the valve core 160 of between 20° and 8° relative to the valve sleeve 162, the lugs engage the cut-outs in the valve core to cause the valve sleeve to be rotated along with the valve core. Such rotation of the valve sleeve 162 causes the piston 142 to move axially in the chamber 136 and, hence, allows for manual steering of the vehicle even if a loss in hydraulic fluid pressure has occurred.

The sleeve section 184 of the valve sleeve 162 includes the plurality of passages 174 which extend from the outer circumference of the sleeve section to the inner circumference. The passages 174 communicate with an annular chamber 190 in the housing 132 which is fluidly connected to the hydraulic pump. A plurality of axially extending grooves 192 are formed in the inner surface of the valve sleeve 162 as is known in the art. The grooves 192 fluidly communicate with the second portion of the grooves 170 in the valve core 160. Further, a first portion of the grooves 192 in the valve sleeve 162 are fluidly connected via passages (not shown) with the first chamber portion 138 in the housing 132, and a second portion of the grooves 192 fluidly connected via passages (not shown) with the second chamber portion 140 in the housing. As is known in the art, when the valve core 160 is rotated relative to the valve sleeve 162, hydraulic fluid is ported through the grooves 170 and 192 and associated passages to one of the chamber portions 138 and 140, while the hydraulic fluid is vented from the other chamber portion, thereby causing the piston 132 to move accordingly.

The ball screw section 186 of the valve sleeve 162 includes a helical groove 194 formed on its outer periphery. A plurality of balls 196 are located in the helical groove 140. The balls 196 are also located in the helical groove 144 in the bore 143 formed in the piston 142. As is well known in the art, axial movement of the piston 142 causes the ball screw portion 186 to rotate which, in turn, causes the rest of the valve sleeve 162 to rotate.

A torsion bar 198 connects the valve core 160 and the valve sleeve 162. One end of the torsion bar 198 is connected by a pin 200 to the valve section 168 of the valve core 160, while the other end of the torsion bar extends through the passage 188 in the valve sleeve 162 and is connected by a pin 202 adjacent the second end 182 of the valve sleeve.

From the above description it should be apparent that actuation of the motor 20 causes rotation of the valve core 160 of the steering gear 130 relative to the valve sleeve 162. Rotation of the valve core 162 causes axial movement of the piston 142 in one direction or the other. Axial movement of the piston 142 results in rotation of the sector gear and the pitman arm 125, thereby causing the road-engaging steerable wheels to turn laterally of the vehicle.

An output position sensor 60 senses the output position of the steering gear 130 and, as a result, senses the position of the steerable road-engaging wheels. The output position sensor 60 may be any suitable position sensor including an optical sensor or an electrical sensor.

Figure 3:
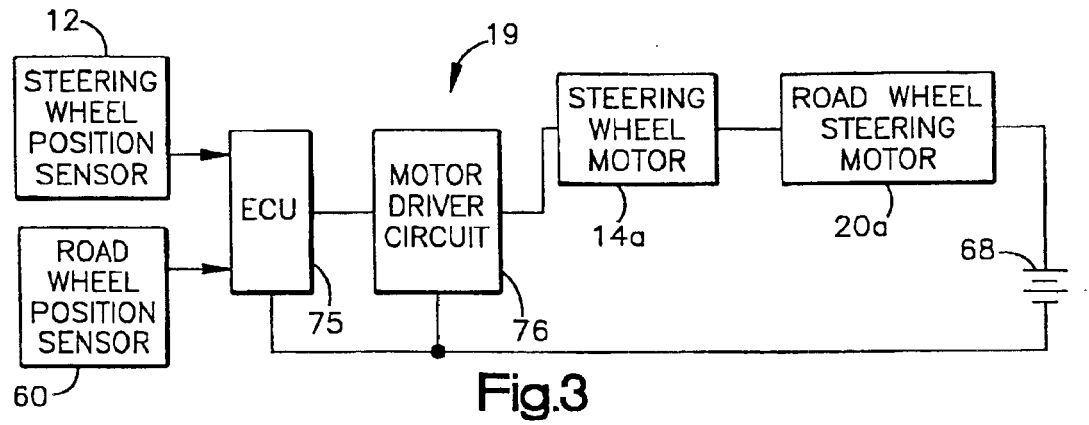
FIG. 3 is a schematic block diagram of an electrical circuit of the steering apparatus shown in FIG. 1.

The electric motors 14 and 20 are preferably of identical construction and a current flowing through one of the motors will provide an output torque which is equal to the same current flowing through the other motor. The apparatus 10 includes an electrical circuit 19 shown schematically in FIG. 3. FIG. 3 illustrates that the windings 14a and 20a of the electric motors 14 and 20, respectively, lie in series in the circuit 19. The power source for the circuit 19 shown in FIG. 3 is preferably the battery 68 of the vehicle.

Figure 4:
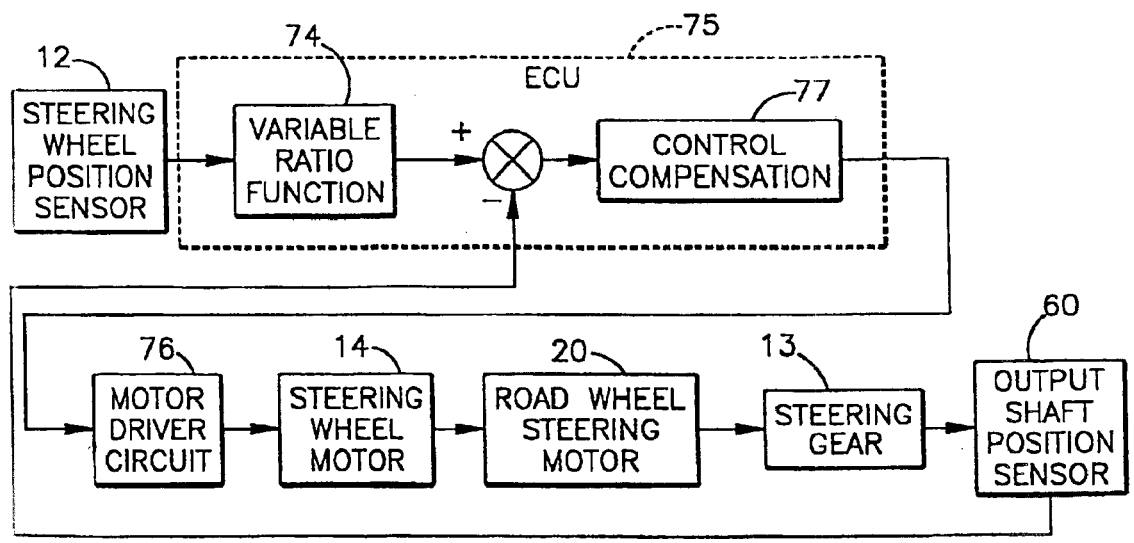
FIG. 4 is a further schematic block diagram of the steering apparatus of FIG. 1.

As illustrated in FIG. 3, the steering wheel position sensor 12 provides an output signal to an electronic control unit (ECU) 75. The ECU 75 then determines the desired road wheel position as a function of the steering wheel position. As shown in FIG. 4, the ECU 75 has a variable ratio function 74 which calculates the demanded road wheel position based on the steering wheel position. The variable ratio function 74 permits a non-linear relationship between road wheel position and steering wheel position. The variable ratio function 74 can use algorithms or lock-up tables to perform the calculation of road wheel position. The ECU 75 also receives a signal from the road wheel position sensor 60. The ECU 75 will determine any errors between the steering wheel position and the road wheel position and actuate a motor drive circuit 76 depending upon the position of the road wheels versus the position that the ECU is commanding the road wheels to take.

A further schematic block diagram of the preferred embodiment of the invention is shown in FIG. 4. The ECU 75 further includes a control compensation circuit 77 which provides an output signal to the motor drive circuit 76. The motor drive circuit 76 provides electrical current to the windings 14a and 20a of the motors 14 and 20, respectively. The motor 14 resists rotation of the steering wheel to provide operator feel, and the motor 20 drives the steering gear 130 and, in particular, the valve core 60 in order to turn the steerable wheels as commanded by the ECU 75.

Since the motors 14 and 20 are preferably identical in construction and since their windings 14a and 20a, respectively, are in series, the torque applied by the motor 20 to the steering gear is also applied by the motor 14 to the steering shaft 13 in order to resist turning of the steering shaft and provide feel to the operator of the vehicle. Since the coils 14a and 20a of the motors 14 and 20, respectively, are in a series, the torque provided by the motor 20 to the steering gear 130 is substantially identical to the torque applied by the motor 14 to the steering wheel 11 to resist the turning of the steering wheel. Thus, even though there is no mechanical connection between the steering wheel 11 and the hydraulic steering gear 130, the torque applied by the motor 14 to the steering wheel 12 makes the operator feel as though there is a mechanical connection between the steering wheel 11 and the hydraulic steering gear 130.

Figure 5:
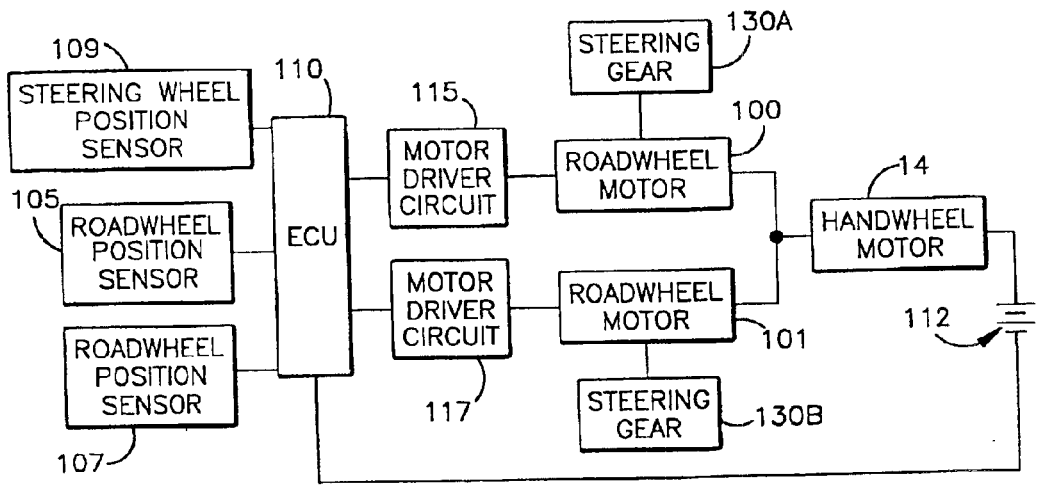
FIG. 5 is a schematic block diagram of a second embodiment of a steering apparatus embodying the present invention.

Another embodiment of the present invention is illustrated in FIG. 5. As shown in FIG. 5, there are separate steering gears 130A and 130B; i.e., a respective steering gear for each of two respective steerable road wheels, or, alternatively, a respective steering gear for ends of two respective vehicle axles. A motor 100 drives steering gear 130A for one steerable wheel, and a motor 101 drives steering gear 130B for another steerable wheel. In the embodiment shown in FIG. 5, there is a road wheel position sensor 105 associated with steering gear 130A and a second road wheel position sensor 107 associated with steering gear 130B. Also, there is a steering wheel or steering wheel position sensor 109 in the embodiment of FIG. 5.

The steering wheel position sensor 109 and the two road wheel position sensors 105 and 107 provide output signals to an electronic control unit (ECU) 110. The ECU 110 is provided with power from the vehicle battery 112. The ECU provides an output signal to the motors 100 and 102. Specifically, the ECU provides an output signal to motor drive circuits 115 and 117 which are associated with the motors 100 and 102, respectively.

As illustrated in FIG. 5, the motors 100 and 102 are in parallel in the circuit, and the motors 100 and 102 are in series with the steering wheel motor 14. Since the motors 100 and 102 are in parallel with each other, the current that flows through the motor windings is summed at the juncture 120 where the current flows into the steering wheel motor 14. The steering wheel motor 14 will thus have a current that flows through it that is equal to a total of the currents flowing through the two road wheel steering motors 100 and 102. Thus, the steering wheel motor 14 will apply a torque to the steering shaft 13 which is equal to the sum of the torques applied by the motors 100 and 102 to the steerable wheels, respectively. As a result, the operator will experience a resistance to turning of the steerable wheels that is almost identical to the torque which is applied by the motor 100 to the steering gear 130A with which it is associated plus the torque applied by the motor 102 to the steering gear 130B with which it is associated.

The system illustrated in FIG. 5 may function to turn one steerable wheel a different angular distance than another steerable wheel is turned. Thus, one of the motors 100 or 102 would be actuated differently than the other. As a result, perfect Ackerman steering can be achieved.

Figure 6:
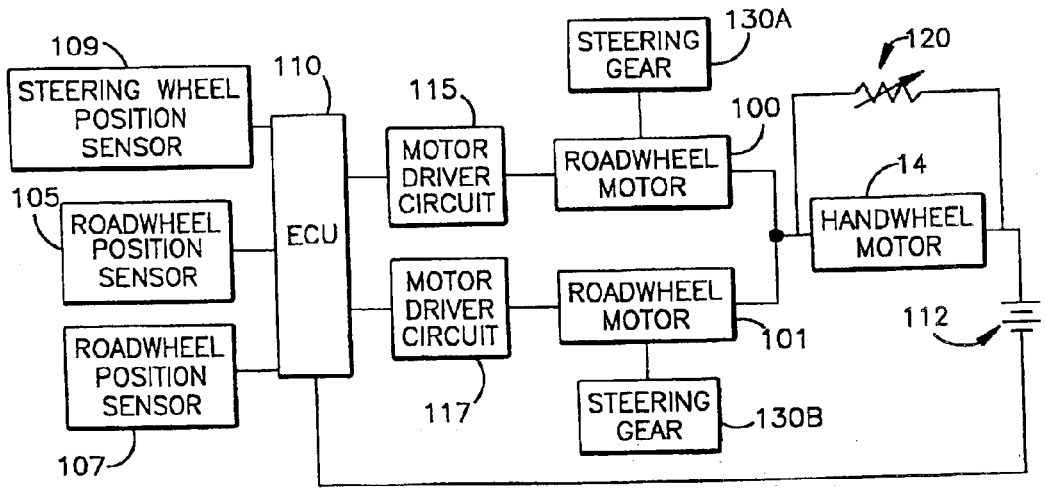
FIG. 6 is a schematic view of an electrical circuit of a third embodiment of the present invention.

A further modification of the present invention is illustrated in FIG. 6. The modification illustrated in FIG. 6 is a modification of the embodiment shown in FIG. 5. The modification shown in FIG. 6 includes a resistor 120 which is a variable resistor in parallel with the steering wheel motor 14. The resistor 120, being a variable resistor and being in parallel with the steering wheel motor 14, will carry some current depending upon the magnitude of the resistance. Thus, the current which flows through the coils of the steering wheel motor 14 will not be equal to the sum of the current which flows through the coils of the motors 100 and 102. Thus, the steering wheel motor 14 will not apply a torque to the steering wheel 11 which is the sum of the torques applied by the motors 100 and 102 to the steering gears 130A and 130B, respectively, with which they are respectively associated. Thus, the operator of the steering mechanism will feel a reduced torque compared to the embodiment of FIG. 5.

In view of the description above, those skilled in the art will become aware of modifications and changes which may be made in the present invention, and such modifications and changes are intended to be covered by the appended claims.

Having described the invention, I claim:

1. A steering apparatus for a vehicle having steerable road-engaging wheels, said apparatus comprising:
a rotatable vehicle steering wheel;
a sensor for sensing the rotational position of said steering wheel and for generating a first signal corresponding to the sensed rotational position of said steering wheel;
a first electric motor for resisting rotation of said steering wheel;
a second electric motor controlled by said first signal;
a steering gear that is actuated by said second electric motor to turn the steerable wheels of the vehicle; and
an electrical circuit that includes said first and second motors in series.

2. A steering apparatus as defined in claim 1 wherein said first and second motors are identical in construction and the magnitude of the current through said first and second motors is substantially the same and the torque produced by said first and second motors is substantially the same.

3. A steering apparatus as defined in claim 1 wherein said steering gear comprises a hydraulic steering gear having a hydraulic valve member that is moved by said second electric motor.

4. A steering apparatus as defined in claim 1 further including a position sensor for sensing the output position of said steering gear, and a control unit responsive to said sensor for sensing rotational position of said steering wheel and for providing a steerable wheel position command depending upon the steering wheel position and the position of the output of the steering gear.

5. A steering apparatus as defined in claim 1 wherein said first and second motors have respective first and second windings which are located in series in said electrical circuit.

6. A steering apparatus as defined in claim 5 further comprising a variable resistor in parallel with said first electric motor.

7. A steering apparatus for a vehicle having at least two steerable road-engaging wheels, said apparatus comprising:

a rotatable vehicle steering wheel;

a sensor for sensing the rotational position of said steering wheel and for generating a first signal corresponding to the sensed rotational position of the steering wheel;

a first electric motor for, when actuated, resisting rotation of said steering wheel;

a second electric motor controlled by said first signal;

a first steering gear actuated by said second electric motor to turn one of said steerable road-engaging wheels;

a third electric motor controlled by said first signal;

a second steering gear actuated by said third electric motor to turn another of said steerable road-engaging wheels; and an electrical circuit having said second and third electric motors in parallel with each other and in series with said first electric motor.

8. A steering apparatus for a vehicle having steerable road-engaging wheels, said apparatus comprising:

a rotatable vehicle steering wheel;

a first electric motor connected with the vehicle steering wheel, said first electric motor being energizable to resist rotation of said steering wheel;

a steering gear operable to turn the steerable wheels of the vehicle;

a second electric motor connected in a series with said first electric motor and connected with the steering gear, said second electric motor being energizable to effect operation of said steering gear; and electrical circuitry which is connected with said first and second electric motors to conduct electrical energy from a one of said first and second electric motors to the other of said first and second electric motors to enable electrical current which effects energization of said second electric motor to also effect energization of said first electric motor.

9. A steering apparatus set forth in claim 8 further including a first sensor which senses the rotational position of said steering wheel and which generates a first electrical signal corresponding to the sensed rotational position of said steering wheel, and a second sensor which senses an output position of said steering gear and which generates a second electrical signal corresponding to an output position of said steering gear, said electrical circuitry being connected with said first and second sensors and being effective to control operation of said first and second electric motors as a function of said first and second electrical signals.

10. A steering apparatus as set forth in claim 8 wherein said first and second electric motors are identical in construction and the magnitude of electrical current conducted through said first and second electric motors is substantially the same and torque produced by said first and second electric motors is substantially the same.

11. A steering apparatus as defined in claim 8 wherein said steering gear includes a hydraulic motor which is connected with the steerable wheels of the vehicle and a hydraulic value assembly is operated by operation of said second electric motor to effect operation of said hydraulic motor and turning of the steerable wheels of the vehicle.

12. A steering apparatus as set forth in claim 8 wherein said first electric motor includes a first winding, said second electric motor includes a second winding, said first and second windings being connected in series by said electrical circuitry.

13. A steering apparatus as set forth in claim 8 further including a variable resistor connected in parallel with one of said first and second electric motors to enable the output of said one of said first and second electric motors with which said variable resistor is connected to be varied.

* * * * *

UNITED STATES PATENT AND TRADEMARK OFFICE
CERTIFICATE OF CORRECTION

| | | |
|---|---|---|
| PATENT NO. | : 6,973,989 B2 | Page 1 of 1 |
| APPLICATION NO. | : 10/239756 | |
| DATED | : December 13, 2005 | |
| INVENTOR(S) | : Daniel E. Williams | |

It is certified that error appears in the above-identified patent and that said Letters Patent is hereby corrected as shown below:

On title page, please insert --Item (60) Related U.S. Application Data
  Provisional Application No. 60/194,132, filed on April 3, 2000.--

Signed and Sealed this

Twenty-third Day of January, 2007

JON W. DUDAS
*Director of the United States Patent and Trademark Office*